Feb. 21, 1933.  I. MUGNANI  1,898,641
DISPLAY DEVICE FOR MOTOR VEHICLES
Filed Feb. 14, 1929
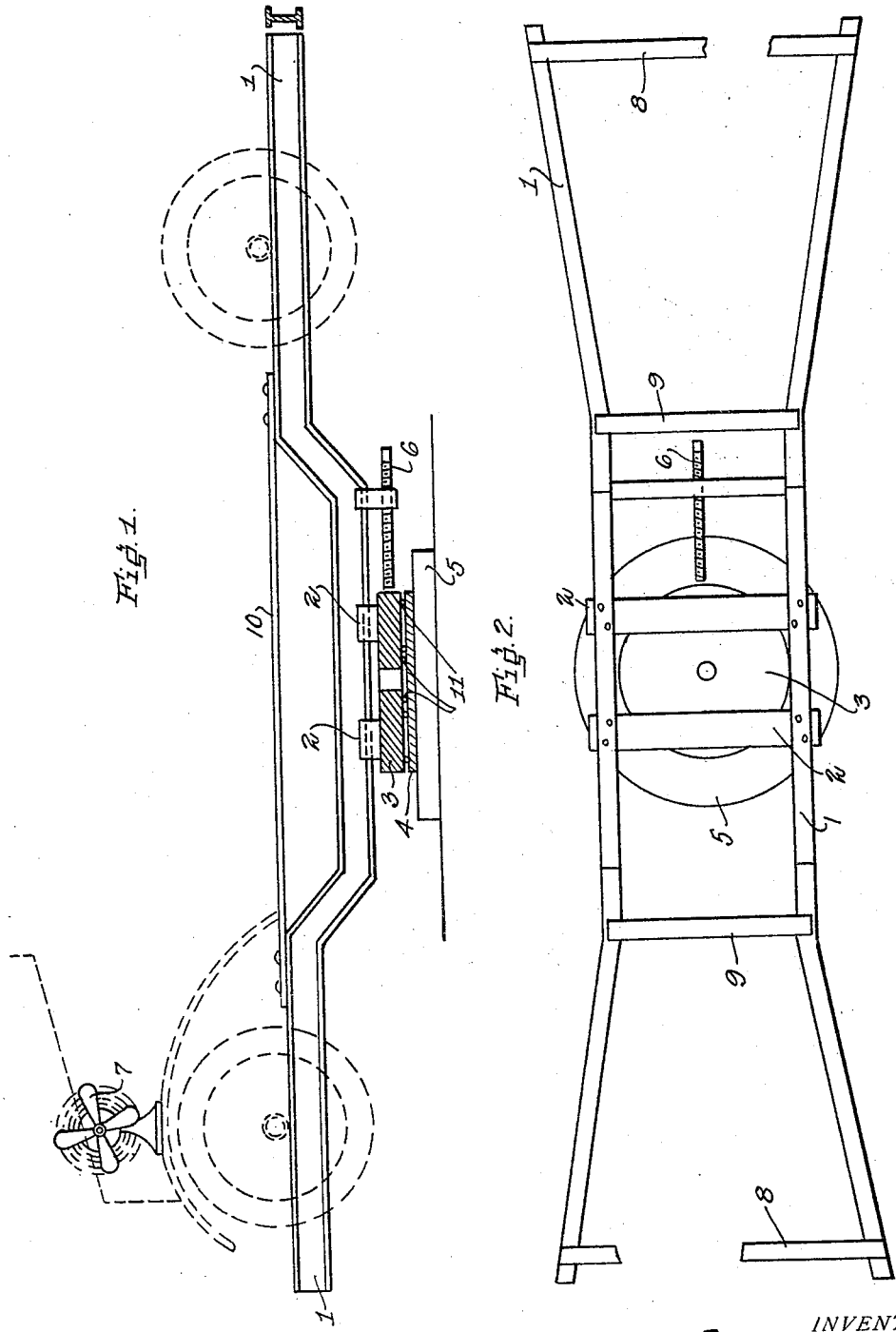
INVENTOR
Italo Mugnani
BY George C. Henmore
ATTORNEY Patented Feb. 21, 1933

1,898,641

UNITED STATES PATENT OFFICE

ITALO MUGNANI, OF PEHUAJO, ARGENTINA

DISPLAY DEVICE FOR MOTOR VEHICLES

Application filed February 14, 1929, Serial No. 339,998, and in Argentina May 2, 1928.

The present invention relates to improvements in display devices particularly to a new gyrating apparatus for the exhibition of coaches, chassis, motor trucks and other vehicles driven by means of the impulse developed by the blades of an electric ventilator or propeller or other similar apparatus, the operation of which is extremely economical.

In order that my application may be more comprehensible, same has been illustrated in the accompanying drawing, in which:

Fig. 1 is a side elevation of the apparatus with the base or lower part shown in longitudinal section, and Fig. 2 is a plan view.

As illustrated, my device comprises a metallic frame constituted by two joists (1), the length of which will vary in proportion to the size of the apparatus in general. The form of these two joists (1) is shown in Figures 1 and 2. The cross-pieces (8) and (9) connect these two joists (1) to form one whole body. On these joists is placed the plate (10) destined to act as a table to support the weight of the vehicle or other object which it is desired to exhibit.

The above described support rests upon the base which is constituted by the following elements:

The circular base (5) of wood or other suitable material, carries the base (4) of a ball bearing, and the part (3) is intended to gyrate on the balls (11) of the bearing mentioned.

Upon this part (3) rests the supports (2) on which is placed the frame (1), and which can be adjusted in its lateral displacement by means of the screw (6).

The ventilator or propeller (7) is placed upon the coach or vehicle placed on the apparatus, in the most convenient position and is electrically driven from any source of electricity not forming part of my invention and therefore not shown.

Working

The working is quite simple. The ventilator (7) acts in the manner of an aerial propeller, causing the apparatus to gyrate circumferentially to its axis, inasmuch as the balls (11) with which its central base is provided, makes it sensitive to any impulse, however slight same may be.

Any loss of balance which may occur, can be rectified by causing the frame (1) to slide on supports (2) by the proper manipulation of screw (6), which is placed beneath the frame (1), as shown in Fig. 1.

Having thus described my invention what I claim as new and desire to secure by Letters Patent is:

A display device for motor vehicles comprising a base and a turntable rotatably mounted on the base, said turntable comprising a frame-supporting member, supports on the member, a vehicle-supporting frame slidably supported on said supports, a hanger secured to and depending from said frame, said hanger being provided with a screw, whereby rotation of the screw for engagement with the member effects a balancing of the turntable on the base, and a propeller adapted to be mounted on the motor vehicle for rotating the turntable and frame with the motor vehicle thereon for displaying all sides of the same.

In testimony whereof I affix my signature.

ITALO MUGNANI.